United States Patent [19]
Gaalema et al.

[11] Patent Number: 4,733,077
[45] Date of Patent: Mar. 22, 1988

[54] NOISE IMMUNE INFRARED READOUT CIRCUITRY

[75] Inventors: Steve D. Gaalema, Encinitas; Mary J. Hewitt, Playa Del Rey; Arthur L. Morse, Hawthorne, all of Calif.

[73] Assignee: Hughes Aircraft Company, Los Angeles, Calif.

[21] Appl. No.: 683,983

[22] Filed: Dec. 20, 1984

[51] Int. Cl.[4] .......................... G01J 1/00; G01T 1/22
[52] U.S. Cl. .................................... 250/338; 250/370
[58] Field of Search .................... 250/330, 332, 338 R, 250/370 G

[56] References Cited

U.S. PATENT DOCUMENTS

| | | | |
|---|---|---|---|
| 4,225,883 | 9/1980 | Van Atta et al. | 250/338 |
| 4,242,706 | 12/1980 | McCormack et al. | 250/338 |
| 4,360,732 | 11/1982 | Chapman et al. | 250/332 |
| 4,523,326 | 6/1985 | Hewitt et al. | 357/8 |

Primary Examiner—Janice A. Howell
Attorney, Agent, or Firm—Ronald L. Taylor; A. W. Karambelas

[57] ABSTRACT

A new technique, and output encoding circuits using that technique, are disclosed for interfacing between a semiconductor IR detector 23 and associated output electronics 24, 25, 26 which technique and circuits transfer a charge packet onto a sense capacitor 22 that previously stored a reset level signal. The resulting stepped signal change, or delta, in the voltage present on that capacitor 22 is employed as the output signal.

13 Claims, 8 Drawing Figures

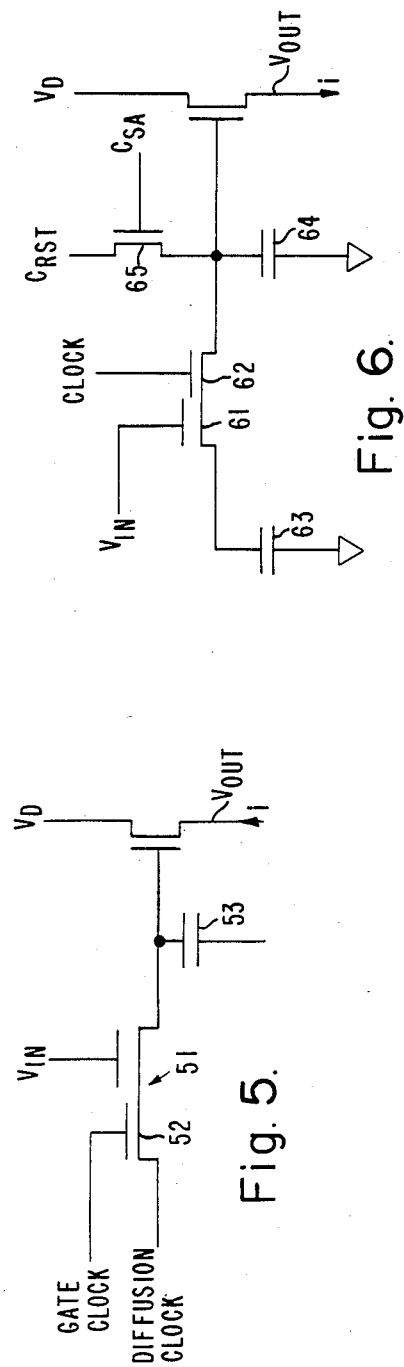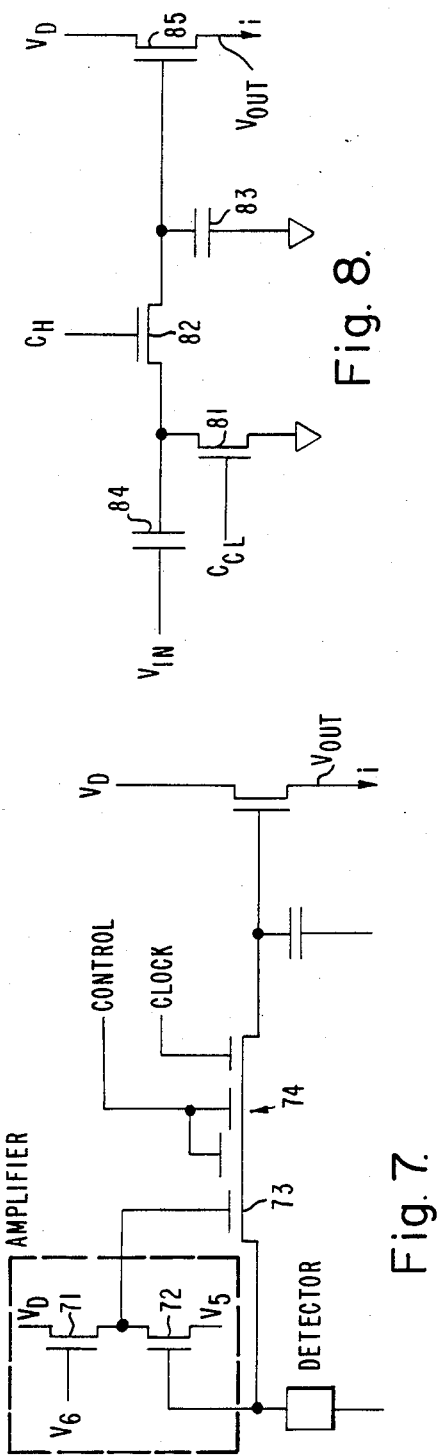

NOISE IMMUNE INFRARED READOUT CIRCUITRY

BACKGROUND OF THE INVENTION

Various infrared devices, including but not limited to device imagers formed on a semiconductive substrate, are described in Wolfe, et al., *The Infrared Handbook*, Office of Naval Research, Department of Navy, 1978, particularly at pages 12-27 through 12-54. Such imagers typically comprise a photodetector, some type of storage component which integrates the detector's photocurrent, and a multiplexing circuit. In the case of charge coupled imagers, the multiplexing circuit is generally implemented with a CCD by an array of parallel charge coupled device serial registers which receive the integrated charge from adjacent photodetectors on the substrate. Often the parallel CCD registers are arranged in vertical columns, all of their outputs being connected to a single horizontal CCD register which serves as a multiplexer for the output signals. The column CCD registers are connected to a common input diffusion and common input gate which separately introduces a bias charge, termed a FAT zero charge packet, into each of the registers.

The imaging ability of such devices is basically noise limited. It is necessary to deal with at least the following noise sources: (1) bias level noise on the reset level, (2) bias level noise on the substrate level, (3) kTC or switching noise, and (4) 1/f noise associated with source followers.

Certain techniques for reducing the effect of such noise sources on the signals produced by CCD imagers are described in a patent application titled "Low Noise Charge Coupled Imager Circuit" by M. J. Hewitt and A. L. Morse, filed with the United States Patent and Trademark Office on Jan. 17, 1983 as Ser. No. 458,607 and assigned to Hughes Aircraft Company. The present invention concerns a technique, and circuits based thereon, for further and significantly minimizing the effects of noise on the output of CCD imagers or any type of integrating infrared device, including a few simple elements on the semiconductor substrate at the output of the multiplexing circuitry or adjacent to each photodetector. As a result of such noise reduction circuits and technique, it is feasible to employ surface channel enhancement mode devices instead of buried channel devices, which do not perform well in the low temperatures typical of many space sensor systems. However, surface channel circuits are susceptible to 1/f noise; the circuits and technique disclosed herein minimize such 1/f noise. Because of the reduction of noise in the output signal achieved for each IR detector using the techniques and circuits described herein, the resulting imagers can be used effectively in high EMI environments. Also, the noise limitations imposed on drive electronics for the imagers can be reduced.

In addition to the low noise features of the circuits and technique disclosed herein, they have the additional advantage of not requiring a full-frame memory to establish differences in signal levels, and in turn the output signal for each photodetector. This reduces the number of digitizations required to process the resulting data, and also reduces the number of bits used in the A/D conversion process. Also, since all capacitors in the circuitry of the arrays disclosed herein can be set at once rather than individually, the number of transitions of the output occurring while a pixel is addressed is reduced. This permits faster readout rates to be employed, and causes less power dissipation since the output can slew at a slower rate. Moreover, the new technique and circuits described herein can be used in a radiation environment since they reduce the effects of (1) threshold drift, (2) increased 1/f noise of the source follower, and (3) increased surface mobility.

SUMMARY OF THE INVENTION

The present invention provides a new technique, and circuits employing that technique, for reading and encoding signals in an infrared (IR) imaging system. Typically such circuits will interface between a semiconductor IR detector or the multiplexing electronics for the detector array.

These circuits, in their various forms, all incorporate what can be termed a delta transfer technique. It is a technique for transferring a sequence of signals to output electronics in an interval significantly less than the interval required by the IR photodetector to change from a reset level to an output level indicative of the sensed IR radiation (termed a frame interval).

The technique described herein for achieving a relatively noise immune infrared readout circuit may be generally described as providing a first capacitive element, to which means are connected to impose an initial signal on the element representative of the reset level of an IR photodetector. Means are connected to the photodetector to accumulate a signal representative of the output of the photodetector during a frame interval. Further means are provided in the circuit, and by the technique, to produce an output signal (e.g., a stepped voltage) proportional to the difference between the initial signal on the capacitive element and the accumulated signal representative of the output of the photodetector, this output signal being produced in a period substantially less than the frame interval. Various circuits are described for employing this technique in both photoconductive and photovoltaic semiconductor IR detectors systems and arrays.

BRIEF DESCRIPTION OF THE DRAWINGS

The invention in further described with reference to the accompanying drawings, in which:

FIG. 5 is a schematic diagram of a further circuit employing the technique of the present invention;

FIG. 6 is a schematic diagram of yet another circuit employing the technique of the present invention;

FIG. 7 is a schematic diagram of another circuit employing the technique of the present invention; and FIG. 8 is a schematic diagram of still another circuit employing the technique of the present invention.

DETAILED DESCRIPTION OF THE INVENTION

Before discussing the technique, and the various circuits employing it, for achieving a relatively noise immune output signal from the detectors in an array of infrared detectors, it is desirable to briefly review a few of the previous techniques that have been used to readout and encode the output from such detectors.

Figure 1:
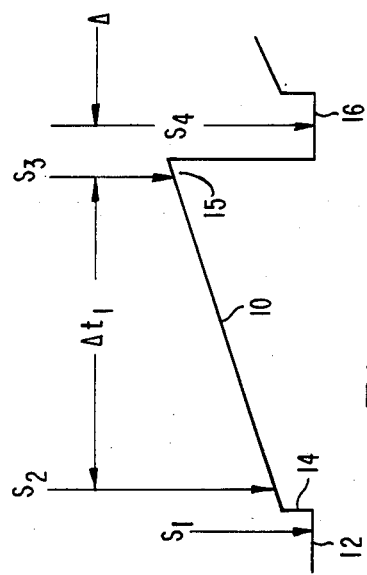
FIG. 1 is a diagram representing a waveform of an IR detector.

Whether the IR detector is of a photoconductive or a photovoltaic type, its output will appear generally as represented in FIG. 1 by the solid line of waveform 10. The lowest level 12 of that output is the reset level, the level to which the detector is set at the beginning of each frame. After being reset, typically the detector will be switched in by a switching FET, the gate of which will have some charge, which charge causes a slight step or increment 14 in the output waveform 10. The output of the detector then increases to a level determined by the IR radiation to which it is exposed. At the end portion of each frame interval, the detector system is again reset from a peak level 15 to a reset level, represented by signal portion 16, which begins the next frame of the image.

The output signal for the photodetector is generally the difference between the signal at $S_2$ and at $S_3$ of the output waveform 10. One technique for determining this difference is referred to as double correlated sample and hold. It samples the waveform just after and then just before reset, i.e., at $S_2$ and $S_3$, thereby eliminating the kTC noise associated with switching. Since noise will somewhat vary the height of signal step 14, which noise will be common to both $S_2$ and $S_3$, by differencing $S_2$ and $S_3$ this noise can be cancelled. However, because such sampling is done over a time period delta $t_1$, which typically is in the order of several 1000 microseconds, the double correlated sample and hold technique is susceptible to low frequency substrate and 1/f noise. Alos, since this technique requires storage of the first level $S_2$ until the second level $S_3$ is sampled, a full frame memory is necessary. Further, since this technique requires subtraction, it is necessary to use additional bits in the A/D conversion process to maintain the same accuracy.

Another technique used previously to achieve an output signal for an IR detector is called the delta reset method. It samples the photodetector's output 10 at $S_3$ then at $S_4$ (the interval being termed delta $t_2$). Since this interval is relatively short, on the order of a few microseconds, 1/f noise will be minimized. Also, because level $S_3$ then level $S_4$ is sampled during a period considerably less than that required for a full frame, full frame memory storage of the signals will not be needed. However, kTC noise and switching noise associated with the resetting operation will be added to the output signal. In addition, the difference of fluctuations during delta $t_1$ on the substrate and reset bias supplies will be added to the output signal as well.

A third method for producing an output signal for an IR detector incorporates parts of both of the foregoing techniques. It is called the double correlated delta reset method. Using it, the photodetector's output 10 is sampled at $S_1$, $S_2$, $S_3$ and $S_4$, the associated electronics then producing an output representing $(S_3-S_4)-(S_2-S_1)$. Because the sample times are on the order of delta $t_2$, as in the delta reset method, the 1/f noise is attenuated considerably. However, this approach requires a full frame memory and additional bits in the A/D conversion process.

From these examples of prior techniques, at least two major problems in encoding the output signal of a photodetector are apparent: (1) there is a lack of noise immunity associated with measuring the integrated signal coming from the detector, and (2) there is severe noise degradation during readout and off-chip decoding of the signal. The techniques previously employed to achieve an output signal for such IR detector arrays deal with these problems in a less than adequate manner; the technique disclosed herein essentially solves these problems.

The basic technique of the present invention for significantly improving the noise immunity of infrared readout circuitry involves storing a signal equal, or proportional, to the reset signal $S_2$ then, at time $S_3$, reading that signal and then a signal related to $S_3$, or the difference between these two, the resultant output being the output of the infrared photodetector for that frame. It may be embodied in any of various circuits.

Figure 2A:
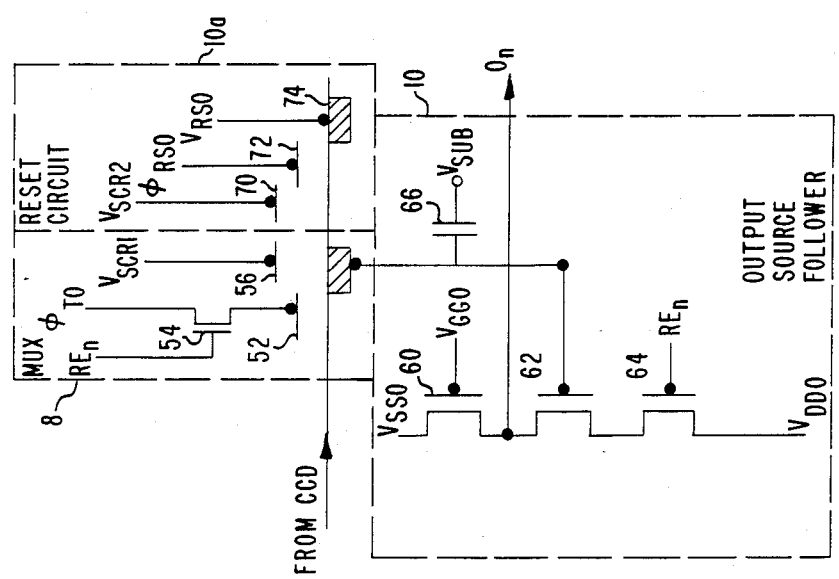
FIG. 2 is a schematic diagram of one circuit for a CCD image detector, the circuit employing the technique of the present invention.
Figure 2:
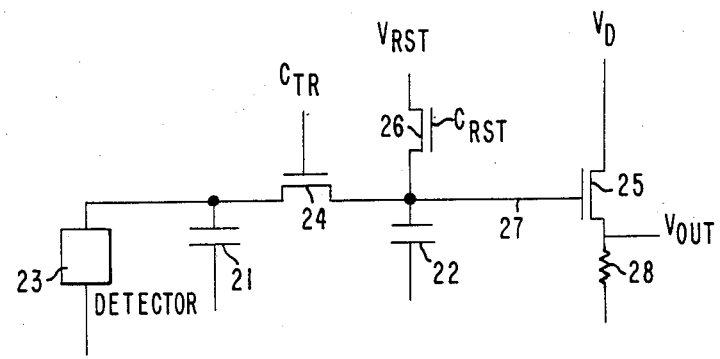

One circuit embodying the technique is shown in FIG. 2. It may be referred to as a delta transfer circuit. It includes two capacitors 21 and 22, connected in parallel and to an infrared photodetector 23. A FET 24 is connected between the two capacitors, and the output of the second capacitor 22, is applied to the gate of a FET 25. FET 26 applies a reset voltage ($V_{RST}$) to line 27 when the pulse from a clock reset signal ($C_{RST}$) is applied to the gate of FET 26. At the same time, a pulse applied to the gate of FET 24 (the pulse being part of a clock signal $C_{TR}$) applies the reset voltage to capacitor 21. Thus, both capacitors 21 and 22 are reset to a known and measured value, $V_{RST}$. Then both FETs 24 and 26 are turned off by their respective clock signals, and the output of detector 23 is integrated by the temporary storage capacitor 21, resulting in a waveform much like that shown in FIG. 1. The output of the circuit ($V_{OUT}$) is read across a resistor 28 by first reading the quiescent voltage determined by (or proportional to) the reset level on capacitor 22, then the transfer FET 24 is clocked by applying an appropriate clocking signal to its gate ($C_{TR}$), allowing the integrated detector charge now stored on capacitor 21 to equilibrate with that on capacitor 22, and causing $V_{OUT}$ to step to a different level determined by the resulting charge on capacitor 22. This completes the sequence of operations for a frame; output signals for subsequent frames are derived in the same fashion.

The output waveform, a step function, may be sampled at two moments a short time apart (comparable to delta $t_2$ in FIG. 1) to virtually eliminate the kTC noise associated with the reset FET. Also, because the sampling rate is so much higher than in other techniques (on the order of ten microseconds) the 1/f noise is greatly diminished, as is low frequency substrate noise. In addition, since the same reset bias level is applied to both the reset and detector signal levels of the output waveform, by subtracting them, the noise common to both is cancelled. And since only one transition occurs in the output waveform ($V_{OUT}$), increased readout rates may be achieved.

Figure 3:
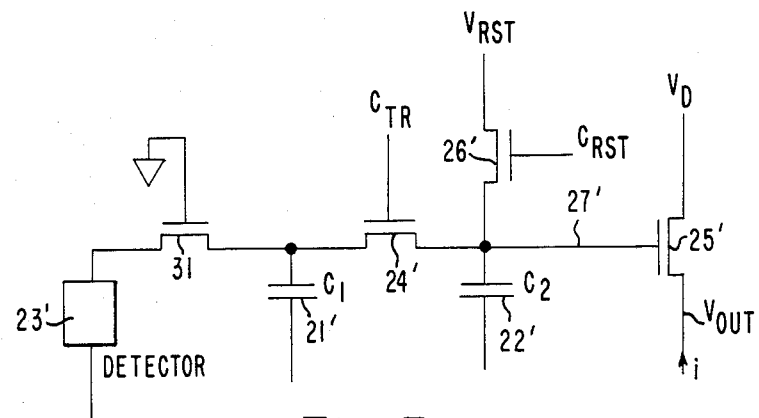
FIG. 3 is a schematic diagram of another circuit employing the technique of the present invention.

A variation of the circuit shown in FIG. 2 is presented in FIG. 3. (Primed numbers in FIG. 3 indicate elements corresponding to the unprimed numbers of FIG. 2.) It employs a FET 31 between the infrared detector 23' and capacitor 21' to act as a buffer and in keeping the detector bias constant, as well as to allow direct injection of the current produced by the detector onto the temporary storage capacitor 21'. In the circuit of FIG. 3, resistor 28 has been replaced by an equivalent arrangement for deriving the output signal, namely a constant current source (i) such as a FET.

Figure 4:
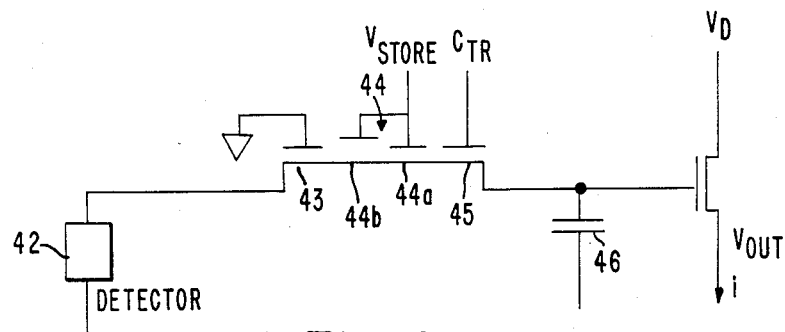
FIG. 4 is a schematic diagram of still another circuit employing the technique of the present invention.

Another circuit employing the technique of the present invention to minimize the effect of noise on an infrared readout circuit is shown in FIG. 4. In the circuits shown in FIGS. 2 and 3, the sense capacitance was the sum of capicitors 21 and 22 for detectors with negligible capacitance. If the detector is a photoconductive device, or if the detector current is large enough to lower the circuit input impedance compared to the detector's impedance, the circuit shown in FIG. 4 is preferred. It can be termed a storage well circuit.

In the FIG. 4 circuit, the temporary storage capacitor has been replaced by a FET storage well. More particularly, a semiconductive device 41 connected to a detector 42 includes a grounded gate FET 43, a storage well FET 44 consisting of a poly 1 gate 44a and a poly 2 gate 44b, and a transfer gate FET 45. By pulsing a potential, $V_{STORE}$, attached to the storage well FET 44, charge may be transferred from the storage well to create an empty storage well and a reset level on connected capacitor 46. Thereafter, the output of detector 42 is allowed to fill the storage well 44 through FET 43. Then $V_{STORE}$ is pulsed again to force all of the charge out of well 44, through transfer gate 45 (by clocking the transfer gate voltage $C_{TR}$) and onto sense capacitor 46. This sequence results in an output, $V_{OUT}$, which steps from one level, equivalent to the toe of the ramp in FIG. 1, to a second level determined by the charge stored in and forced out of the well, equivalent to the heel (or peak) 15 of the ramp shown in FIG. 1. The effect of the FIS noise (the variation in step 14 shown in FIG. 1) may be minimized by appropriately shaping the potential well of the charge storage area, or bucket, of device 41.

In the circuit shown in FIG. 4, the net sense capacitance is the value of capacitor 46. All of the output produced by the detector and stored in the FET storage well 44 will be transferred to that capacitor. As an alternative, a Tompsett sampler circuit may be used. It eliminates the need for a storage well, yet is compatible with normal IR detector array output circuits.

In the circuit shown in FIG. 5, a photovoltaic IR detector produces a signal which is applied as $V_{IN}$ to semiconductive element 51. Included in this element is a gate clock FET 52. At the start of a frame interval, the gate clock FET is turned on and the diffusion clock signal pulsed to place the voltage of $V_{IN}$ on capacitor 53. The gate clock is then turned off and $V_{IN}$ charges due to the output of the detector circuit. When $S_3$ occurs (see FIG. 1) the value of $V_{OUT}$ is sampled (being at that instant the reset $V_{IN}$, or $S_{21}$ on capacitor 53). Then the gate clock is turned on and the diffusion clock pulsed to place the new value of $V_{IN}$ on capacitor 53. The output, $V_{OUT}$, is again sampled, the difference in the two successive samples determining the output signal of the detector for that frame. The advantages of this Tompsett sampler circuit stems from the fact that the input waveform $V_{IN}$ is now controlling the gate of the FET semiconductive element. This isolates $V_{IN}$ so that the signal coming from the detector need not be stiff.

As another example of useful circuitry which can be developed employing the technique of the present invention, the output of the IR detector, or a charge proportional to that output, may be amplified and the gain associated with the amplification precisely controlled by the circuit shown in FIG. 6. This circuit may be termed a charge amplifier circuit. In it, the input signal, $V_{IN}$, is again used, this time to control a FET gate 61. A second gate 62 is used for switching and isolation. To initiate the sequence of operations during a frame, both capacitors 63 and 64 are set to an initial voltage level using the reset FET 65 by pulsing $C_{RST}$ and $C_{SA}$. Then capacitor 63 is isolated by pulsing the clock signal applied to control gate 62, and capacitor 64 brought to a different voltage level by pulsing $C_{SA}$ applied to the gate of FET 65, the different voltage level being determined by $C_{RST}$. Charge is allowed to accumulate at the $V_{IN}$ gate until the control gate 62 is again opened by the clock signal, this corresponding to point $S_3$ of FIG. 1. The $V_{IN}$ gate then becomes the control gate, and charge is transferred from capacitor 63 to capacitor 64 by an amount equal to the charge in voltage of the $V_{IN}$ waveform. Assuming that capacitor 63 is greater than capacitor 64, the voltage change across capacitor 64 will be larger than that across capacitor 63 by the ratio of these two capacitances $C_{63}/C_{64}$. In this manner, the detector's output may be amplified in a precisely controlled way.

Another circuit employing the technique of the present invention, and using a synthetic transimpedance amplifier (TIA), is shown in FIG. 7. The operation of this circuit is similar to that shown in FIG. 4, except that a TIA is used to buffer the detector input. The TIA is formed by FETs 71 and 72. A gate bias voltage, $V_G$, is applied to the gate of FET 71. A drain voltage, $V_{D1}$ is applied to one side of FET 71, and a source supply voltage, $V_S$, is applied to one side of FET 72. The operation of this TIA is well known, and will be apparent to those skilled in this field. The TIA itself is set for negative gain, by appropriately adjusting the applied voltages, and acts as a buffer for the input waveform applied to FET 73 of semiconductive element 74 by lowering the input impedance by the gain of the amplifier at low detector current levels. It also reduces the bias change across the detector.

To generate the desired level of change, or delta, in the detector's output signal, a circuit such as shown in FIG. 8 may be employed. Basically, it is a clamp sample and hold circuit. It produces an absolute difference between the detector signal sampled at $S_2$ (see FIG. 1) and that at $S_3$. Prior to $S_2$, the clamp gate FET 81 and the hold gate FET 82 are turned on by appropriately pulsing the clamp voltage $C_{CL}$ and the hold voltage $C_H$. This places a grounded, or zero voltage, signal across the output capacitor 83. Then, as the waveform from the detector approaches $S_2$, the voltage across the input capacitor 84 is the voltage waveform produced by the detector (represented by signal 10 in FIG. 1). At $S_2$, $C_{CL}$ is turned off so that, as the detector integrates charge, the voltage across the input capacitor 84 remains fixed at $S_2$. At $S_3$, the hold clock signal $C_H$ is turned off. At this time, the output capacitor 83 has a signal across it equal to $S_3 - S_2$, and it can be clocked out through the output source follower FET in the manner previously described. The circuit is reset by turning on signals $C_{CL}$ and $C_H$ again, to commence a new frame.

In accordance with the technique previously described, as illustrated in the various circuits set forth herein, an integrating IR imaging device is achieved which exhibits both low noise and high sensitivity. By transferring a charge packet on to a capacitive element, a signal change or delta proportional to the voltage present on that capacitor can be measured and employed as the output. Such a technique, and circuitry employing it, may be applied to any general analog system where low noise characteristics are required. Each of the circuits described herein incorporate this delta transfer technique to convert the IR detector signal to an output voltage signal that can be multiplexed or otherwise used by the rest of the electronics system. The delta transfer technique significantly increases immunity of the detector's output to virtually all the various noise sources commonly encountered.

Of course, others skilled in this field, when employing the delta transfer technique, may prefer to use circuits somewhat different than those set forth herein. Accordingly, the scope of the invention is not limited to such circuits, but rather is set forth in the following claims.

What is claimed is:

1. An output encoding circuit for an associated IR detector element, the circuit including:
   (1) a first capacitive element;
   (2) means to periodically impose a signal across the first capacitive element proportional to the reset level of an associated infrared detector, so as to initiate a frame interval;
   (3) means to accumulate the output of the associated infrared detector for a frame interval; and
   (4) means (a) to readout from the first capacitive element the reset signal level, then (b) to impose on the first capacitive element a signal proportional to the output of the IR detector, and then (c) to readout the IR detector signal on the first capacitive element, these sequential operations (a), (b) and (c) defining a pixel address period substantially less than the frame interval, such that output encoding circuit produces a stepped output voltage representative of the delta change on the first capacitive element during the sequential readout operations for each successive frame interval.

2. An output encoding circuit as set forth in claim 1 in which said means to accumulate the detector's output includes a second capacitive element, the readout means including a transfer gate FET for selectively connecting the second capacitive element to the first capacitive element.

3. An output encoding circuit as set forth in claim 2 in which the means to impose the reset signal comprises a reset gate FET, the input to which may connected to a reference voltage source and the output of which is directly connected to said first capacitive element, and further including a transfer gate FET to selectively impose the reset signal on said second capacitive element.

4. An output encoding circuit as set forth in claim 3, further including a buffer FET connected between the detector and said second capacitive element for maintaining a constant detector bias and permitting direct injection of the detector signal onto said second capacitive element.

5. An output encoding circuit as set forth in claim 2 in which the means to readout the IR detector signal on the second capacitive element reads out substantially all of said signal.

6. An output encoding circuit as set forth in claim 2 in which the second capacitive element is a FET storage well.

7. An output encoding circuit as set forth in claim 6 in which said the detector and the associated output encoding circuit are located physically adjacent to one another on a semiconductor's surface and as part of an array.

8. An output encoding circuit as set forth in claim 6 in which the FET storage well is part of a Tompsett sampler circuit.

9. An output encoding circuit as set forth in claim 8 in which said second capacitive element is connected to the diffusion layer of the FET storage well, and including means to selectively electrically isolate the second capacitive element from the first capacitive element.

10. An output encoding circuit as set forth in claim 1 in which said the detector and the associated output encoding circuit are located physically adjacent one another on a semiconductor's surface and as part of an array.

11. An output encoding circuit as set forth in claim 6, including a synthetic transimpedance amplifier connected to supply the detector signal to the FET storage well.

12. An output encoding circuit as set forth in claim 2 in which the second capacitive element is connected in series to supply the detector signal to said transfer gate FET, and further including a clamp gate FET connected to selectively return said first capacitive element to a reset signal condition.

13. An output encoding circuit as set forth in claim 12 in which the clamp gate FET is connected between said second capacitive element and said transfer gate FET to, with the transfer gate FET, selectively return said first capacitive element to a reset signal condition.

* * * * *